Figure 1:
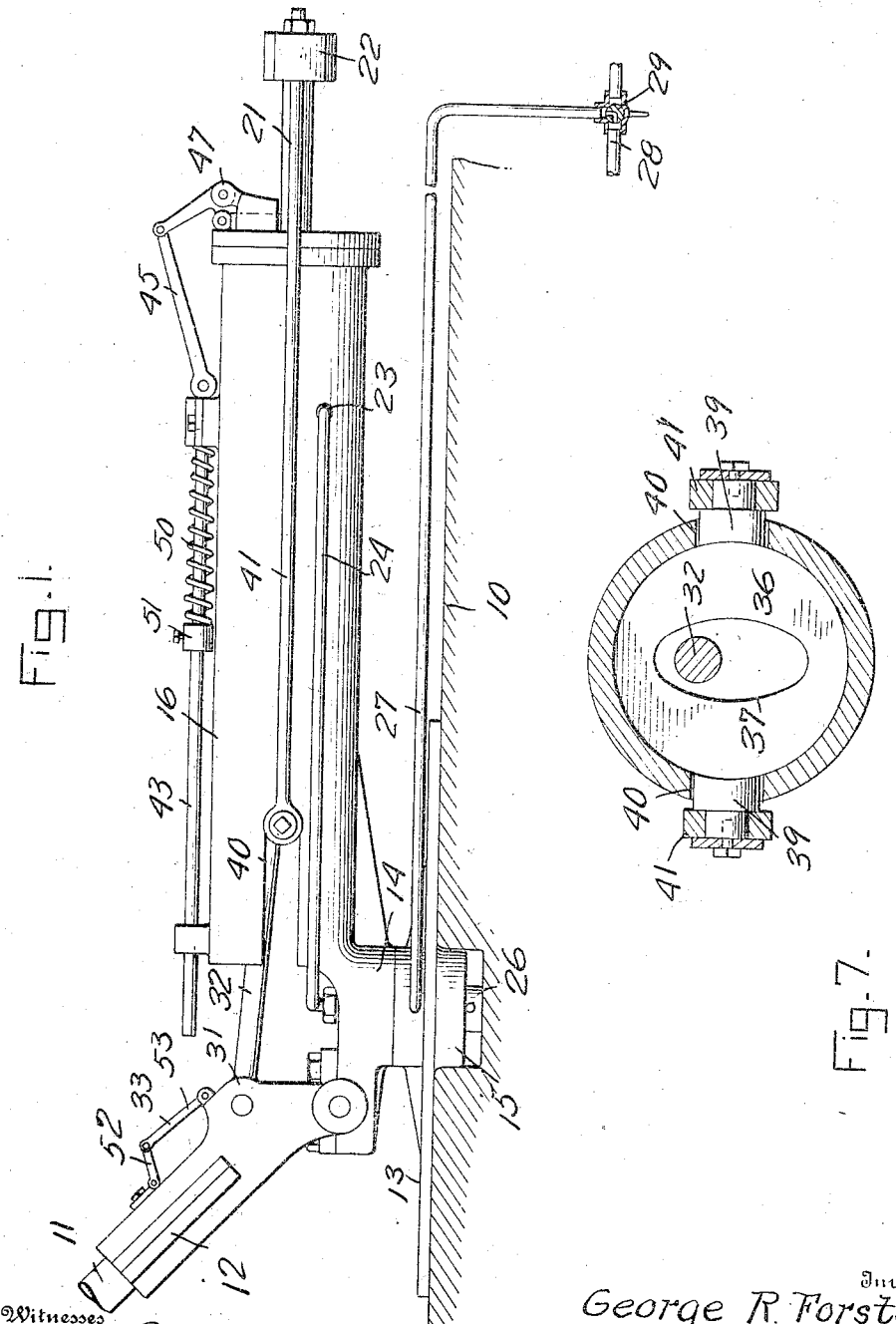

No. 866,781. PATENTED SEPT. 24, 1907.
G. R. FORSTER.
TROLLEY.
APPLICATION FILED APR. 27, 1907.
3 SHEETS—SHEET 2.
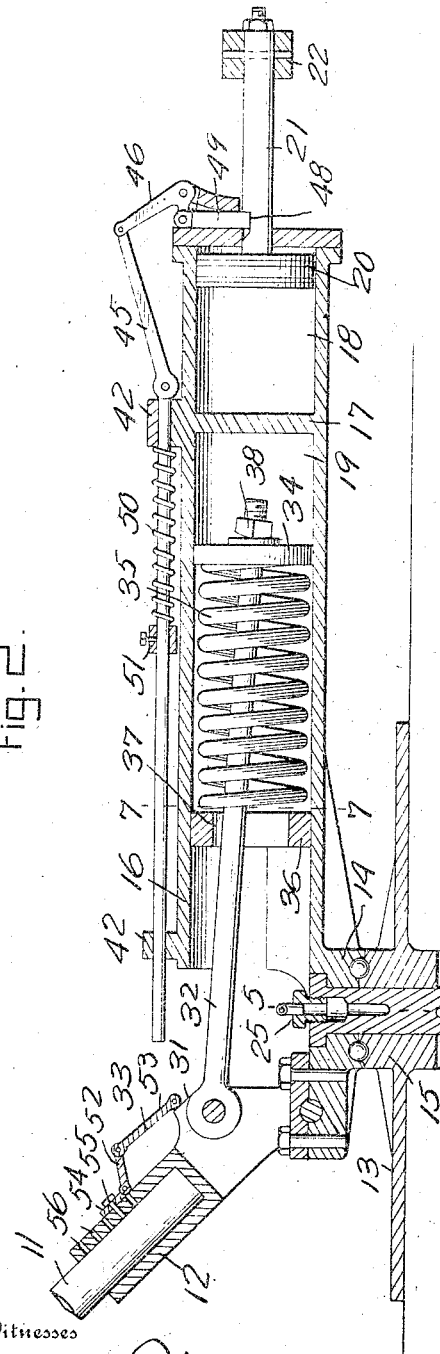
Fig. 2.
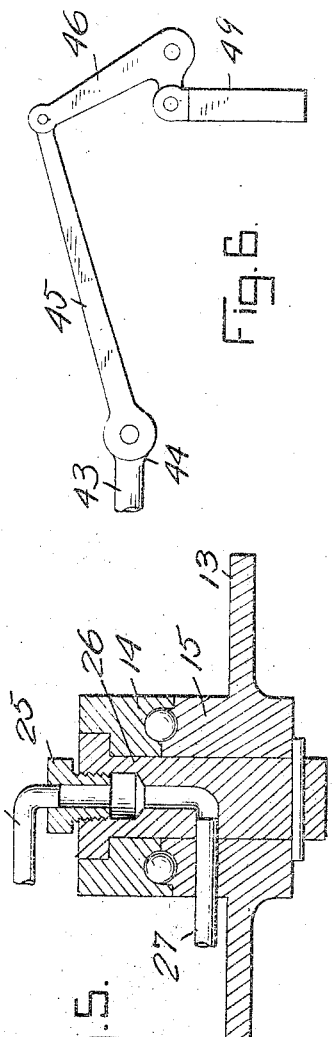
Fig. 6.
Fig. 5.
Witnesses
G. R. Thomas
F. C. McQuillony
Inventor
George R. Forster
By Chandler & Chandler
Attorneys

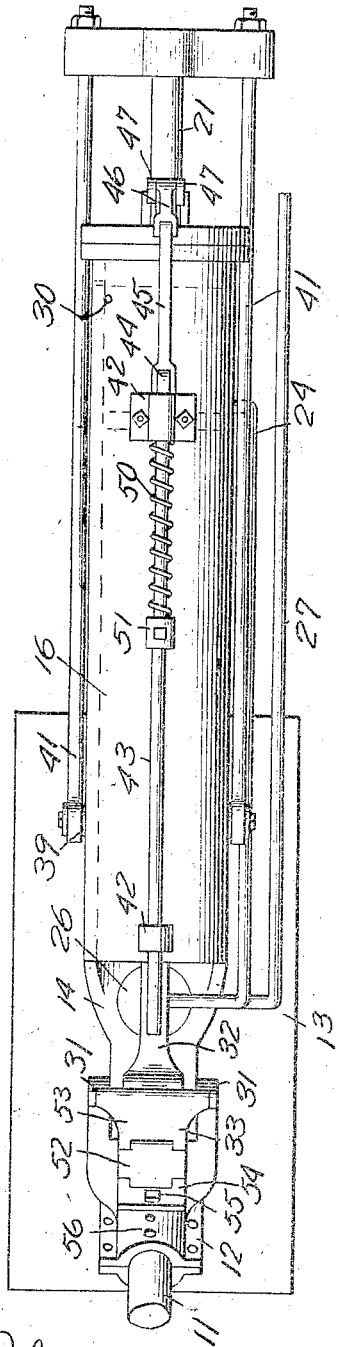
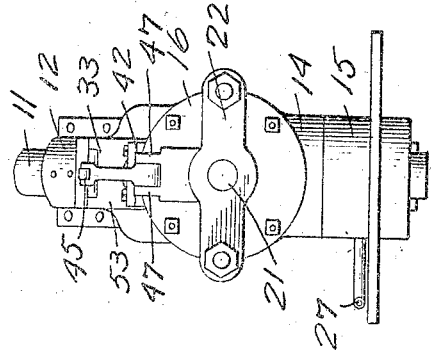

UNITED STATES PATENT OFFICE.

GEORGE R. FORSTER, OF FITHIAN, ILLINOIS.

TROLLEY.

No. 866,781.  Specification of Letters Patent.  Patented Sept. 24, 1907.

Application filed April 27, 1907. Serial No. 370,624.

*To all whom it may concern:*

Be it known that I, GEORGE R. FORSTER, a citizen of the United States, residing at Fithian, in the county of Vermilion, State of Illinois, have invented certain new and useful Improvements in Trolleys; and I do hereby declare the following to be a full, clear, and exact description of the invention, such as will enable others skilled in the art to which it appertains to make and use the same.
The present invention relates to improvements in apparatuses for controlling the movements of trolley poles for electric railways, and it has particular reference to an arrangement of devices, whereby the trolley is automatically lowered as soon as it leaves the trolley wire, and is thereafter raised by the application of fluid pressure.

A further object of the invention resides in the provision of trip mechanism which is engaged with the stem of the piston located in the pressure chamber until the trolley leaves the trolley wire when the release of such mechanism will effect the actuation of the device for lowering the trolley pole.

With the above and other ends in view, the invention consists in the construction, combination, and arrangement of parts, all as hereinafter more fully described, specifically claimed, and illustrated in the accompanying drawings, in which like parts are designated by corresponding reference numerals in the several views.
Of the said drawings—Figure 1 is a side elevation of the trolley-controlling apparatus. Fig. 2 is a longitudinal vertical section therethrough. Fig. 3 is a top plan view of Fig. 1. Fig. 4 is an end view. Fig. 5 is a transverse vertical section taken on the line 5—5 of Fig. 2. Fig. 6 is an enlarged detail view of the trip mechanism. Fig. 7 is a transverse section taken on the line 7—7 of Fig. 2.

In Fig. 1 a portion of an electrically-propelled vehicle is shown, upon the roof of which the trolley is mounted.

Referring more particularly to the drawings, the trolley, which is of the under-running type, is shown as mounted upon the roof of the vehicle 10 and as consisting in its essential parts of a pole 11, secured within a socketed holder 12 pivoted about a horizontal axis to the trolley base 13 which last-mentioned element consists of an upper member 14, and a lower member 15 pivoted together, the lower member being fastened to the roof of the vehicle.
The upper member 14 of the trolley-base is provided with a horizontal tubular cylinder 16, which is divided by a partition 17 into a pressure chamber 18 and a spring-receiving chamber 19. Disposed within the chamber 18 is a piston 20, whose stem 21 extends through an axial opening in the closed end of said chamber, and carries on its outer end a cross-head 22. The pressure chamber is provided, adjacent the partition 17, with a port 23 communicating with one end of an air-pipe 24, whose opposite end is fitted in a hollow plug 25, which is tapped into the bolt 26, by means of which the base sections are pivoted together, said bolt being provided with a longitudinal bore having a lateral extension into which one end of a second air-pipe 27 is fitted, the opposite end of said pipe being connected with a pipe 28, which is in turn connected with a source of fluid pressure (not shown). The pipes 27 and 28 are connected by a T-joint having a rotatable plug 29 provided with an L-shaped valve passage, the plug being turned in one direction or the other by an operating handle. The opposite arm of the T-joint is connected with an air-escape pipe, with which the valve passage in the plug may be made to communicate. The pressure chamber is further provided with a leak hole 30, by means of which the speed of movement of the piston is regulated.

The pole holder 12 is provided upon its upper face with a pair of spaced ears 31, between which is disposed the enlarged end of a rod 32, which end is provided with a horizontal perforation, alining with the perforations formed through said ears, the bolt upon which said rod is pivoted passing through the several perforations, as shown. The ears 31, above referred to, are connected by a rearwardly-extending contact plate 33, the free end of which is bolted to the holder, as shown in Fig. 2. The opposite end of the rod 32 carries a plate 34, against which bears one end of a heavy helical spring 35, the opposite end of which bears against a second plate 36, provided with an elongated axial opening 37, through which the rod 32 passes. Displacement of the plate 34 from said rod is prevented by a nut 38. The plate 36 is provided with a pair of diametrically-opposite horizontal extensions 39, which project through alining slots 40 formed upon opposite sides of the chamber 19, and are connected to the adjacent ends of a pair of rods 41, whose opposite ends are fastened to the cross-head 22. The tubular cylinder 16 is further provided upon its upper face with a pair of vertical guides 42, having alining openings formed therethrough, in which is slidably engaged a rod 43, one end of which is provided with an eye 44, connected with one end of a pitman 45, the opposite end of which is pivoted to one arm of an angle-lever 46, the opposite arm of which is pivoted between a pair of ears 47, projecting laterally from the closed end of the pressure chamber 18 and disposed directly above a notch 48, formed in the squared upper face of the piston stem 21. The angle-lever 46 is in turn provided with a depending trigger finger 49, which is moved into and out of engagement with the notch 48, as hereinafter described.

When the several parts are in their normal position, as shown in Figs. 1 and 3, disengagement of the finger 49 from the notch formed in the piston stem is prevented by reason of the tension exerted by an expansible coil-spring 50, which embraces the rod 43 and bears at opposite ends against the forward guide 42 and a collar 51 carried by said rod, thus holding the eye end of said rod against the adjacent face of the guide above referred to. In such position, the spring 35 is compressed by the movement of the rods 41, which are connected to the cross-head 22 on the piston stem, the piston having been retracted by the action of the compressed air admitted through the port 23. When, however, the trolley leaves the trolley wire, the pole will swing upwardly by reason of the partial expansion of the spring 35, thus bringing the plate 33 into contact with the adjacent end of the rod 43, moving the latter forwardly against the action of the spring 50, and releasing the finger 49 from the notch 48, thus permitting the complete expansion of the spring 35 with a resultant lowering of the trolley pole into position adjacent the car roof, such expansion of the spring moving the cross-head and piston connected thereto forwardly at the same time. The piston is then again retracted upon the admission of compressed air to the pressure chamber, whereupon the trolley pole will again be raised until its wheel is in contact with the trolley wire, the piston being retained in its retracted position through the automatic engagement of the finger 49 in the notch 48.

The two members of the trolley base, which are pivoted together by the bolt 26, are preferably provided with races formed on their mutually adjacent faces in which antifriction bearings of any type are disposed, to permit an easy rotary movement of the upper member of the base.

The contact plate 33, which is carried by the holder, is rendered capable of a slight angular adjustment by being formed of a pair of sections 52 and 53, which are pivotally connected together at their mutually-adjacent ends, the opposite end of the first-mentioned section being further provided with a perforated stud 54 pivoted thereto, the stud bolt 55 for retaining the stud in place passing through the perforation therein and extending into any one of a series of openings 56 formed in the adjacent face of the holder.

What is claimed, is—

1. In a trolley for electric railways, the combination of a trolley base; a cylinder located upon said base and provided with a partition forming front and rear compartments; a trolley-pole pivoted to said base; a rod pivoted to said pole and extending into the rear compartment; a coil-spring carried by said rod; a fluid-operated piston located within the front compartment and connected with said spring for compressing the latter to raise said pole; means adapted to engage said piston, to hold the spring in compressed condition; and means for releasing said holding means from engagement with said piston, to permit the spring to expand and lower the pole.

2. In a trolley for electric railways, the combination of a trolley base; a cylinder located upon said base and provided with a partition forming front and rear compartments; a trolley pole pivoted to said base; a rod pivoted to said pole and extending into the rear compartment; a coil-spring carried by said rod; a fluid-operated piston located within the front compartment and connected with said spring for compressing the latter to raise said pole; trip mechanism carried by said cylinder and adapted to automatically engage said piston, to hold the spring in compressed condition; and means carried by said pole for releasing said trip mechanism from engagement with said piston, when the pole leaves the trolley wire, to permit the spring to expand and lower the pole.

3. In a trolley for electric railways, the combination with a trolley base and a trolley pole pivoted thereto, of a cylinder located upon said base; a fluid-operated piston disposed within said cylinder for raising said pole; means carried by said cylinder and adapted for automatic engagement with said piston, to hold the pole in raised position; automatically-operated means for releasing said last-mentioned means from engagement with said piston when the pole leaves the trolley wire; and means for automatically lowering the pole upon such release of said holding means.

4. In a trolley for electric railways, the combination with a trolley base and a trolley pole pivoted thereto, of a cylinder located upon said base; a fluid-operated piston disposed within said cylinder and connected with said pole, for raising the latter; trip mechanism carried by said cylinder for automatically engaging said piston to maintain said pole in raised position; means carried by said pole for releasing said trip mechanism from engagement with said piston when the pole leaves the trolley wire; and means disposed within said cylinder and connected with said pole for automatically lowering the latter upon the release of said trip mechanism.

5. In a trolley for electric railways, the combination with a trolley base and a trolley pole pivoted thereto, of a cylinder located upon said base; a fluid-operated piston disposed within said cylinder and connected with said pole, for raising the latter; a rod slidably mounted upon said cylinder; trip mechanism carried by said cylinder and connected with said rod for automatically engaging said piston, to maintain said pole in raised position; means carried by said pole and adapted to contact with said rod when the pole leaves the trolley wire for moving said rod endwise to release said trip mechanism from engagement with said piston; and means disposed within said cylinder and connected with said pole for automatically lowering the latter upon the release of said trip mechanism.

6. In a trolley for electric railways, the combination with a trolley-base and a trolley pole pivoted thereto, of a cylinder located upon said base; a fluid-operated piston disposed within said cylinder and connected with said pole, for raising the latter, said piston having a notched stem; a rod slidably mounted upon said cylinder; trip mechanism carried by said cylinder and connected with said rod; a coil-spring carried by said rod for normally forcing the latter rearwardly of the cylinder, to cause the trip mechanism to automatically engage the notched stem of the piston when the latter is retracted, to maintain said pole in raised position; means carried by said pole and adapted to contact with said rod when the pole leaves the trolley wire for forcing said rod forwardly of the cylinder against the action of said spring, to release said trip mechanism from engagement with the notched stem of said piston; and means disposed within said cylinder and connected with said pole for automatically lowering the latter upon the release of said trip mechanism.

7. In a trolley for electric railways, the combination with a trolley base, a pole holder pivoted thereto, and a pole carried by said holder, of a cylinder located upon said base; a fluid-operated piston disposed within said cylinder and connected with said holder for raising the pole; a rod slidably mounted upon said cylinder; trip mechanism carried by said cylinder and connected with said rod; a coil-spring carried by said rod for normally forcing the latter rearwardly of the cylinder, to cause the trip mechanism to automatically engage said piston when the latter is retracted, to maintain said pole in raised position; a plate carried by said holder and adapted to contact with said rod when the pole leaves the trolley wire, for forcing said rod forwardly of said cylinder, to disengage the trip mechanism from said piston; and means disposed within said cylinder and connected with said holder for automatically lowering the pole upon the disengagement of said trip mechanism.

In testimony whereof, I affix my signature, in presence of two witnesses.

GEORGE R. FORSTER.

Witnesses:
WILLIAM C. VANDERVOORT.
THEO. TILLOTSON.